United States Patent
Lange et al.

(10) Patent No.: US 6,462,864 B1
(45) Date of Patent: Oct. 8, 2002

(54) DUAL SUBSTRATE LAMINATE-CONFIGURED OPTICAL CHANNEL FOR MULTI-FIBER RIBBON FORM FACTOR-COMPLIANT INTEGRATED MULTI-CHANNEL OPTICAL AMPLIFIER

(75) Inventors: Michael Ray Lange, Melbourne, FL (US); Michael O'Reilly, Melbourne, FL (US); Charles E. Bryant, Fellsmere, FL (US)

(73) Assignee: Harris Corporation, Melbourne, FL (US)

( * ) Notice: Subject to any disclaimer, the term of this patent is extended or adjusted under 35 U.S.C. 154(b) by 73 days.

(21) Appl. No.: 09/785,726

(22) Filed: Feb. 16, 2001

Related U.S. Application Data (63) Continuation-in-part of application No. 09/627,823, filed on Jul. 28, 2000.

(51) Int. Cl.[7] .................................................. H01S 3/00
(52) U.S. Cl. ................................ 359/341.1; 359/341.32
(58) Field of Search ........................ 359/333, 341.1, 359/341.3, 341.32; 372/6; 385/114

(56) References Cited

U.S. PATENT DOCUMENTS

| | | | |
|---|---|---|---|
| 5,282,080 A | 1/1994 | Scifres et al. | 359/344 |
| 5,396,362 A | 3/1995 | Yakmyshyn et al. | 359/245 |
| 5,420,947 A | 5/1995 | Li et al. | 385/37 |
| 5,815,309 A | 9/1998 | Lawrence et al. | 359/333 |
| 5,854,865 A | 12/1998 | Goldberg | 385/31 |
| 5,892,857 A | 4/1999 | McCallion | 385/1 |
| 5,946,433 A | 8/1999 | Yamamoto et al. | 385/36 |
| 5,978,531 A | 11/1999 | Funabashi | 385/45 |
| 5,982,961 A | 11/1999 | Pan et al. | 385/30 |
| 6,021,239 A | 2/2000 | Minami et al. | 385/36 |
| 6,026,205 A | 2/2000 | McCallion et al. | 385/30 |
| 6,052,220 A | 4/2000 | Lawrence et al. | 359/341 |
| 6,229,939 B1 * | 5/2001 | Komine | 385/29 |
| 6,370,297 B1 * | 4/2002 | Hakimi et al. | 385/27 |
| 6,407,852 B1 * | 6/2002 | Lange et al. | 359/333 |

FOREIGN PATENT DOCUMENTS

| JP | 2001156363 | * 6/2001 |
|---|---|---|

* cited by examiner

*Primary Examiner*—Mark Hellner
(74) *Attorney, Agent, or Firm*—Allen, Dyer, Doppelt, Milbrath & Gilchrist, P.A.

(57) ABSTRACT

A multi-fiber ribbon-coupled multi-channel, optical amplifier architecture has a very compact form factor that facilitates one-for-one alignment with and coupling to each optical fiber of a multi-fiber ribbon. A dual substrate structure contains a first substrate having a signal transport core laminated with a second substrate having an associated pumping energy-receiving, pseudo-cladding layer. This use of separate substrates prevents dopant material of the signal transport core from intruding into the pseudo-cladding material. The bulk layers are polished and laminated so that the signal transport core is in intimate face-to-face abutment with the pseudo-cladding layer. The back side of the bulk containing the pseudo-cladding material is lapped and polished to expose pseudo-cladding material, and provide a generally planar surface that facilitates coupling of the pseudo-cladding layer (and its abutting core) with a pumping energy source.

10 Claims, 5 Drawing Sheets

DUAL SUBSTRATE LAMINATE-CONFIGURED OPTICAL CHANNEL FOR MULTI-FIBER RIBBON FORM FACTOR-COMPLIANT INTEGRATED MULTI-CHANNEL OPTICAL AMPLIFIER

CROSS-REFERENCE TO RELATED APPLICATION

The present application is a continuation-in-part of co-pending U.S. patent application Ser. No. 09/627,823, filed Jul. 28, 2000, by M. Lange et al, entitled: Multi-Fiber Ribbon Form Factor-Compliant, Integrated Multi-Channel Optical Amplifier" (hereinafter referred to as the '823 application), assigned to the assignee of the present application and the disclosure of which is incorporated herein.

FIELD OF THE INVENTION

The present invention relates in general to fiber optic communication systems and components therefor, and is particularly directed to the use of a pair of substrates, in which respective pumped 'pseudo'-cladding and optical signal transport channels are installed, for face-to-face laminated abutment to implement respective optical waveguide amplifier channels of the integrated optical amplifier architecture described in the above-referenced '823 application.

BACKGROUND OF THE INVENTION

Figure 1:
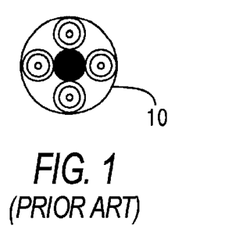
FIG. 1 is a reduced complexity cross-sectional illustration of a conventional single mode optical fiber cables.
Figure 2:
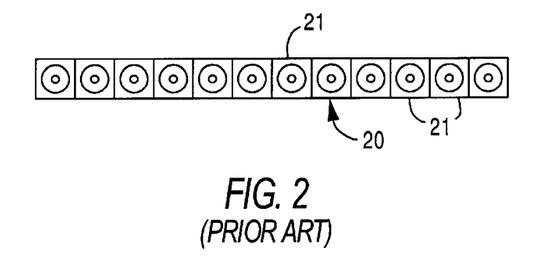
FIG. 2 diagrammatically illustrates the cross-section of a multi-optical fiber ribbon.

Because of bundle density limitations associated with the individual buffered fibers and connector interface configurations of legacy, single mode optical fiber cables (a reduced complexity cross-section of one of which is shown at 10 in FIG. 1), especially those containing a relatively large number of 'fiber' strands, optical communication equipment and component suppliers have begun offering relatively thin, or flat multiple optical fiber-containing ribbons and small form factor multi-channel connector interfaces. As further shown in FIG. 2, the flat, rectangular cross-section of such a multi-fiber ribbon 20 facilitates densely packing a relatively large number of such fibers 21 within a physical volume that is both compact and readily conformal with a variety of housing and equipment surfaces.

Figure 3:
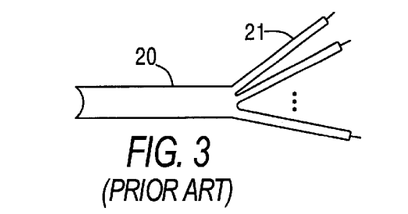
FIG. 3 diagrammatically illustrates a break out of individual optical fibers from a multi-fiber ribbon.
Figure 4:
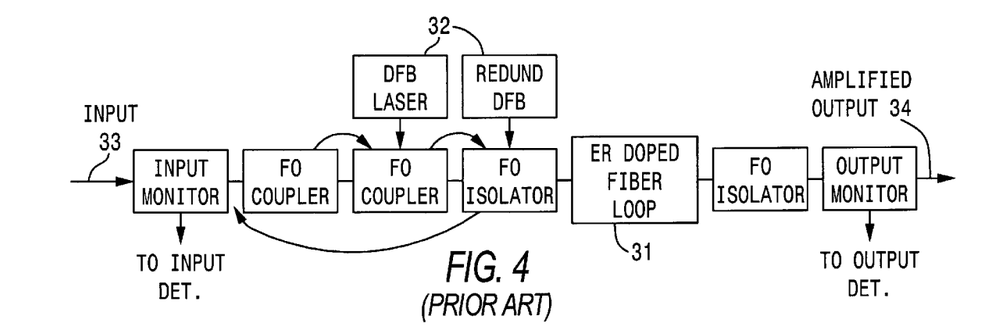
FIG. 4 is a component block diagram of a conventional optical fiber repeater.
Figure 5:
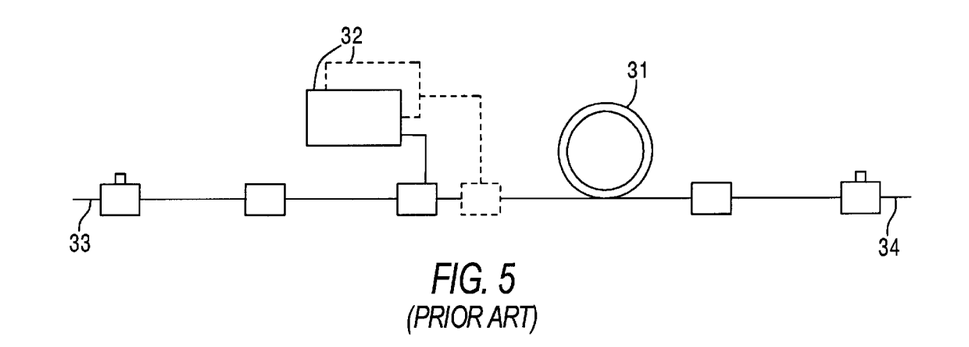
FIG. 5 is a diagrammatic optical fiber signal transport view of the optical fiber repeater of FIG. 4.

Unfortunately, when employed in applications requiring amplification of optical signals transported by the various fibers of the ribbon cable, such as in long haul repeaters, it is necessary to break out each individual fiber 21 from the ribbon, as illustrated in FIG. 3, and then connect each fiber to its own dedicated optical amplifier unit. Such an optical amplifier unit, a block diagram of which is shown in FIG. 4 and an optical fiber signal transport view of which is shown in FIG. 5, is typically a relatively large sized and costly piece of equipment.

These size and cost drawbacks are due to the number of individual fiber-interfaced components employed, long loops 31 of optical pumping energy absorbing and amplifying material (such as erbium-doped fiber) required for gain, the need for relatively narrow spectrum, distributed feedback laser diode pumps 32 (which require thermoelectric coolers and associated control circuits therefor), as well as the substantial hand labor necessary to physically interface individual components and the input and output ports 33, 34 of each amplifier unit with a respective fiber of the ribbon fiber bundle.

Figure 6:
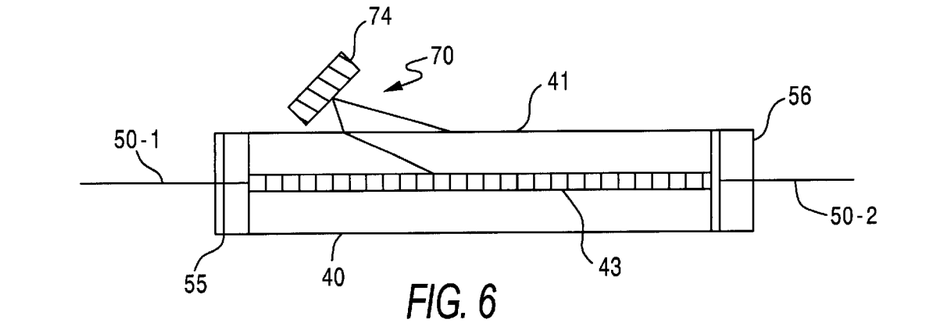
FIG. 6 is a diagrammatic side view of an embodiment of the multi-channel optical fiber ribbon-coupled optical amplifier disclosed in the above-referenced '823 application.
Figure 7:
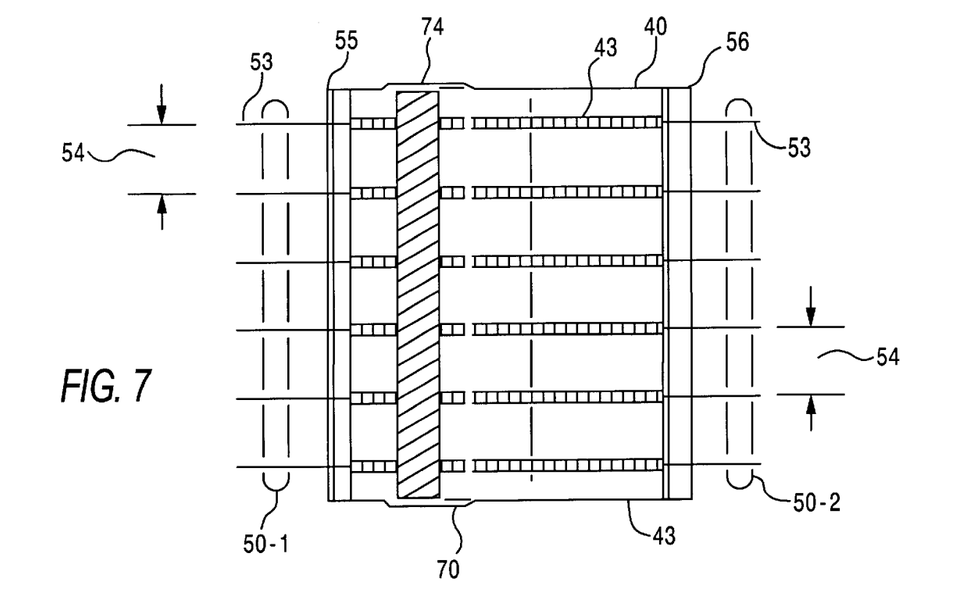
FIG. 7 is a partial diagrammatic plan view of the multi-channel optical amplifier of FIG. 6.

Advantageously, these and other shortcomings of conventionally having to use individual fiber-dedicated light amplifiers are effectively obviated by the multi-fiber ribbon-interfaced optical amplifier architecture described and shown in the '823 application, respective diagrammatic side and top views of a prism-coupled embodiment of which are depicted in FIGS. 6 and 7. As shown therein, the main body of this improved multi-fiber ribbon-interfaced amplifier comprises a support substrate 40 made of a bulk material such as a glass, and having a generally planar surface 41, in which a plurality of spatially adjacent (e.g., parallel) optical waveguide channels 43 are formed.

The waveguide channels 43 are optically coupled with an array of pumping energy sources 74, whose optical pumping energy outputs are introduced into the optical waveguide channels by means of a multi-channel optical interface 70 arranged adjacent to the substrate surface 41. As a non-limiting example, the substrate 40 may contain twelve optical waveguide channels 43, corresponding to the number of (single mode, nominal 1550 nm wavelength) fibers within currently commercially available, reduced form factor multi-optical fiber ribbons. For purposes of reducing the complexity of the drawings, the partial diagrammatic plan view of FIG. 7 shows six of the twelve waveguide channels 43 in the support substrate 40.

The optical waveguide channels 43 have mutually adjacent center-to-center spacings that conform with mutually adjacent, center-to-center (nominally 250 microns) spacings 54 of the optical fibers 53 of an 'upstream' (multiple input signal-conveying) section of industry standard, multi-optical fiber ribbon 50-1, and a 'downstream' (multiple amplified signal-conveying) section of multi-fiber ribbon 50-2. In order to effect mechanical and optical end coupling between respective sections 50-1 and 50-2 of multi-fiber ribbon and optical waveguide channels 43 of the substrate 40, multi-fiber ribbon interface connectors 55 and 56 may be employed.

The relatively narrow (widthwise) dimensions of the components of this multi-channel fiber optic amplifier allow the amplifier to be configured such that its width-wise dimension essentially conforms with that of a section of reduced form factor multi-fiber ribbon. The resulting form factor of this highly integrated optical amplifier architecture is considerably reduced compared to conventional cable-installed structures, which require a separate break-out to a dedicated amplifier device for each fiber strand, as described above. For a twelve channel application, the overall width of the multi-channel optical amplifier may be slightly larger than three millimeters.

Figure 8:
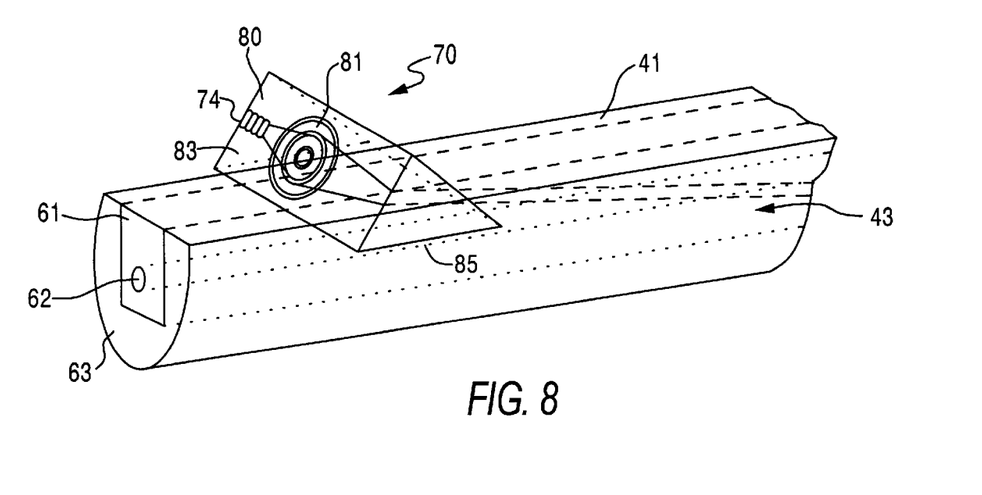
FIG. 8 is a partial perspective view of an optical waveguide channel employed in the optical amplifier of FIG. 6.

FIG. 8 is a partial perspective view of an optical waveguide channel and an associated pumping energy source, such as that contained in an M×N spatial array of pumping energy sources, as well as a portion of the optical interface used to image the output of the pumping source into the channel. As shown therein, a respective optical waveguide channel 43 comprises a central (signal transport) core 62, through which a signal light beam from an upstream ribbon fiber propagates, and an adjacent cladding layer 61, that partially surrounds the core 62. The signal transport core 62 is dimensioned to have a cross section that may nominally conform with that of an associated ribbon fiber, so that the core 62 serves as the principal signal transport medium and amplifying medium through the amplifier for a signal light beam coupled thereto from a respective ribbon fiber of the input multi-fiber ribbon section 50-1.

For this purpose, the core 62 may comprise an optically transmissive material whose photonically stimulated, energy state transfer properties readily absorb optical energy supplied by a one or more light amplification pumping sources (such as pumping sources that emit a nominal 980 nm optical beam) and provides emitted radiation-stimulated amplification of the (nominal 1550 nm) signal beam. As a non-limiting example of a suitable material, the core 62 may comprise erbium ytterbium-doped phosphate glass (e.g., phosphate glass containing 22% $Yb^{3+}$ and 2.2% $Er^{3+}$).

The inner cladding 61 surrounding the core 62 may comprise a glass material, that is like or similar to that of the core, but is undoped, and having a slightly lower index of refraction. An outer cladding layer 63 serves to both improve the focusing tolerance window upon which one or more pumping optical energy beams are imaged for amplifying the signal beam propagating in the core 62, and allows an increase in power density (watts/$cm^2$) of the incident pumping source beam along the gain interaction length of the core. This clad core waveguide structure may be formed by a controlled implantation of silver (Ag) ions through a metalized masked planar glass surface, or pulled into a fiber from a multiple clad preform of phosphate glass, to form a clad and a core region having an elevated optical index with Yb/Er dopant concentration in the core.

Figure 9:
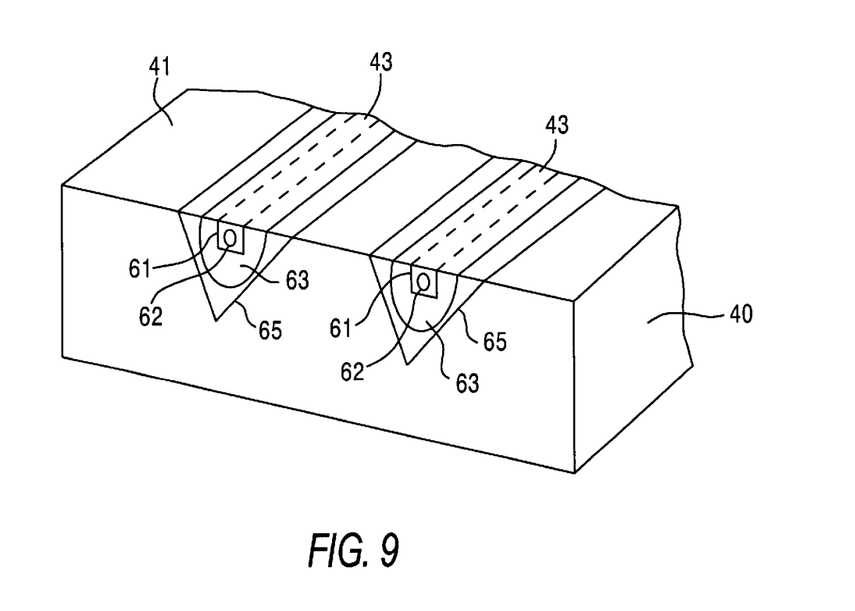
FIG. 9 shows a plurality of 'V'-shaped grooves patterned in an optical amplifier substrate, and containing clad core-configured optical amplifier channels.

As further shown in the perspective view of FIG. 9, in order to accurately align and place each of the optical waveguide channels in the support substrate, so that their center-to-center channel spacings match the center-to-center spacings of the optical fibers of a multi-fiber ribbon, a plurality of spatially adjacent (e.g., parallel) 'V'-shaped grooves 65 may be patterned (e.g., etched) in the surface 41 of the substrate 40, in spatial alignment with the required channel separation pattern. The V-shaped grooves 65 are sized to receive and retain the clad core-configured channels 43, which may be affixed in the grooves by means of a suitable fiber optic epoxy, such as Armbruster's UVA040 optical grade epoxy.

In order to conform with the intended reduced (multi-fiber ribbon width-based) form factor, spatially adjacent (e.g., parallel) beams of optical pumping energy are coupled (focussed) into the respective optical waveguide channels 43 of the substrate 40 from a direction that is generally optically transverse to the channels, namely, in a direction that forms an acute angle with the direction of a waveguide channel, and is typically greater than zero and less than or equal to 90°.

Figure 10:
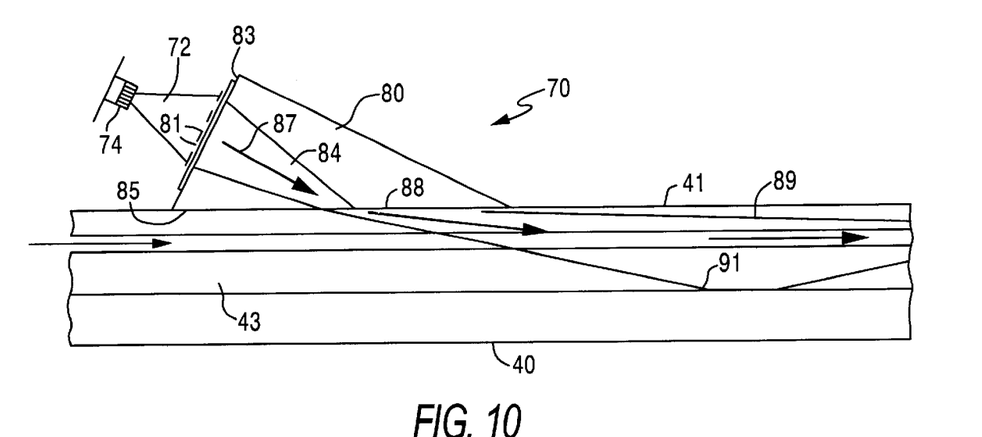
FIG. 10 shows a prism-coupled embodiment of the optical amplifier disclosed in the '823 application.

As shown in FIGS. 6 and 7, and in enlarged detail in the side view of FIG. 10, the multi-channel optical interface 70 may be arranged immediately adjacent to the substrate surface 41 in which the channels 43 are formed, and may be configured to receive a plurality of pumping energy light beams 72 from a plurality (e.g., M×N spatial array) of spatially adjacent pumping energy sources 74.

As a non-limiting example, the pumping energy sources 74 may comprise a 1×N (one-dimensional), or M×N (two-dimensional) array of diode-laser emitter elements, such as but not limited to edge-emitting laser diodes, vertical cavity surface emitting laser (VCSEL) elements, and the like. While a 1×N array of pumping energy sources may be sufficient for the purpose, an M×N array is preferred, since a two dimensional array provides additional power using lower cost components, as well as providing redundant pumping sources for each channel. Each pumping source element may generate a nominal 980 nm output optical beam, that is readily absorbed by Yb/Er doped material of the channel, so as to produce therein the desired stimulated emission of (1550 nm) photons for amplifying the (nominal 1550 nm) signal beam.

The light beams from the pumping energy emitters 74 diffract or 'spread', and propagate generally transverse to the axes of the channels 43, making it necessary to focus and redirect the pumping energy of each emitted beam, so that the output of each pumping source is optimally coupled into only its associated optical waveguide channel. As shown in FIGS. 8 and 10, this confined pumping energy coupling may be achieved by the combination of an M×N array of micro-lenses or diffractive optic elements (DOEs) 81 distributed over (e.g., directly etched into or provided on a separate light transmissive layer that is attached to) a pumping beam-receiving surface 83 of a prism element 80.

Each micro-lens or DOE 81 focuses a respective pumping energy beam along a prescribed refraction path 84 through the bulk material of and onto a generally planar surface 85 of the prism 80, that directly abuts the planar surface 41 of the channel-supporting substrate. The parameters of the focussing elements (e.g., micro-lenses, DOEs) and the geometry and refractive index of the prism 80 are defined such that each focussed pumping beam emerges from the prism surface 85 in a direction through the optical waveguide channel 43 that effectively redirects and confines the pumping beam to the optical waveguide channel.

Because each pumping beam for a respective channel is refracted through the prism-waveguide interface 85, it emerges from that surface and couples into its associated optical waveguide channel at a respectively different angle. As shown by the sequence of arrows 87, 88 and 89 in FIG. 10, the coupling angle for each pumping energy beam entering the waveguide channel 43 from the prism 70 is such that the pumping energy is confined to the channel, and undergoes multiple reflections, one of which is shown at 91, as the beam repeatedly passes back and forth between the cladding and the signal-transporting core, where the pumping energy is absorbed, during its propagation along the channel.

As pointed out above, as the energy in the 980 nm pumping beam 72 is absorbed by the doped Yb/Er glass of the channel, the photonically stimulated energy state transfer properties of the channel provide emitted radiation-stimulated amplification of the 1550 nm signal beam propagating through the core 62. For the illustrated example, which uses a standard input signal wavelength of 1550 nm and a pumping energy wavelength of 980 nm, a substrate length on the order of four to eight centimeters has been found to provide both amplification of a signal beam by the energy contained in its associated pumping beams, as well as a relatively compact form factor in the lengthwise direction of the amplifier.

Figure 11:
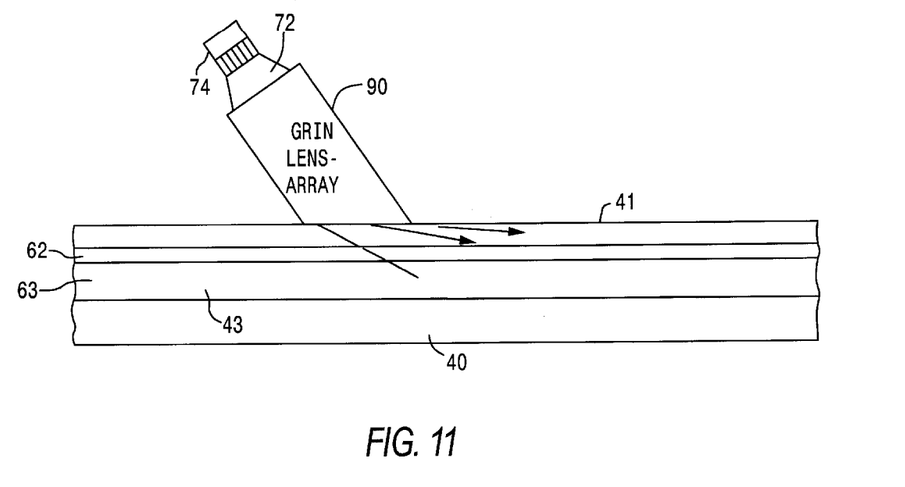
FIG. 11 illustrates a GRIN lens-coupled embodiment of the optical amplifier disclosed in the '823 application.

FIG. 11 illustrates a modification of the above amplifier architecture, in which the prism and focusing lens array described above are replaced by an array 90 of gradient indexed (GRIN) lenses. This GRIN lens array 90 is supported by a mounting fixture, not shown, between the pumping energy source array and the planar surface 41 of the substrate 40 containing the optical waveguide channels of the amplifier. The number of lenses of the GRIN lens array 90 corresponds to the number of pumping source elements 74, so that there is a one-for-one focusing of the light beams 72 generated by the pumping energy emitters 74 into the optical waveguide channels 43.

Like the prism and associated micro-lens array architecture described above, the optical coupling functionality of the GRIN lens array 90 causes each pumping beam 72 to be focussed into a respective optical waveguide channel 43 in a direction that effectively confines the injected pumping beam within the waveguide channel as it propagates down the channel, so that the energy in the pumping beam will be transferred to and thereby amplify the signal beam.

Figure 12:
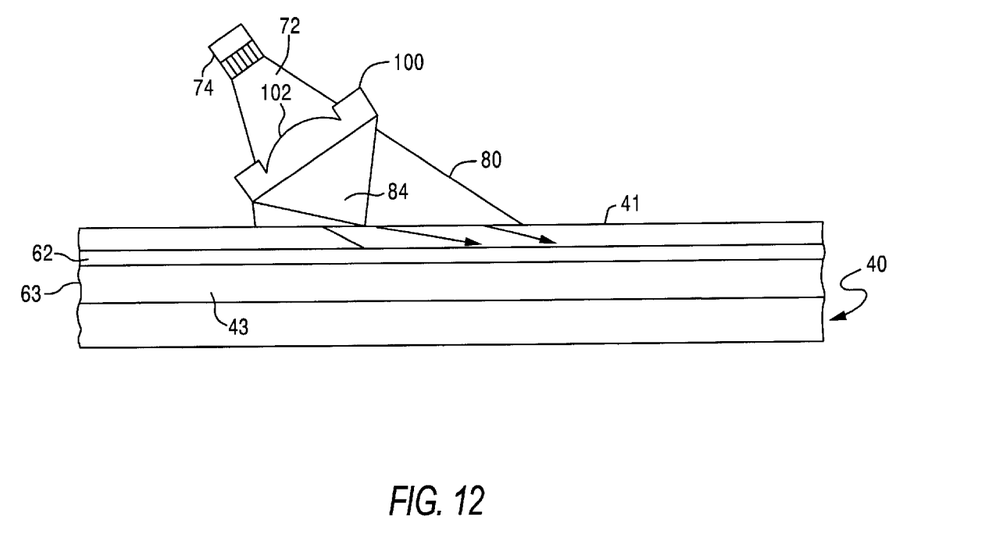
FIG. 12 illustrates a spherical lenslet array-coupled embodiment of the optical amplifier disclosed in the '823 application.

FIG. 12 shows a further modification of the optical amplifier of FIG. 10, in which the prism and focusing lens array are replaced by an array 100 of lenslets, such as spherical lenslets 102. As in the embodiment of FIG. 11, the lenslet array 100 is interfaced to, or etched in the surface of a prism, similar to prism 80 in FIG. 10, and may be supported by a mounting fixture, not shown, that is installed between the pumping energy source array 74 and the planar surface 41 of the substrate 40 containing the optical waveguide channels 43 of the amplifier. The number of lenslets 102 of the array 100 preferably corresponds to the number of pumping source elements 74, so that there is a one-for-one focusing of the light beams 72 generated by the pumping energy emitters 74 into the optical waveguide channels 43.

As described above, a respective channel of the optical amplifier architecture disclosed in the '823 application employs a bulk glass substrate that contains a (rare earth-doped) signal transport core surrounded by a larger geometry (undoped) cladding layer into which the pumping energy is directed. This larger geometry cladding layer serves to reduce the tolerance of the pumping energy focusing window that would otherwise be required if the pumping energy were directed only into the core; it also allows an increase in power density of the incident pumping source beam along the gain interaction length of the core.

With the core and its immediately contiguous cladding layer being formed in the same bulk material (such as by controlled ion implantation through a masked planar glass surface, or pulled into a fiber from a multiple clad preform of phosphate glass, which processes require high precision parameter controls, and attendant cost), there is a likelihood that some of the dopant of the core will also be present in the cladding layer, and thereby undesirably cause the cladding layer to be optically lossy, reducing the efficiency and performance of the channel.

SUMMARY OF THE INVENTION

In accordance with the present invention, this problem is effectively obviated by a new and improved laminated optical substrate structure, in which the core and an associated pumping energy-receiving, pseudo-cladding layer are formed in respectively separate bulk layers, so that the dopant material of the core cannot intrude into the pseudo-cladding material. The bulk layers in which the core and pseudo-cladding regions/layers have been formed are then polished and laminated with the core placed in intimate face-to-face abutment with the pseudo-cladding layer.

The back side of the bulk containing the pseudo-cladding material is then lapped and polished to expose the pseudo-cladding material, and provide a generally planar surface that facilitates coupling of the pseudo-cladding layer (and thereby its abutting core) with an associated pumping energy source, such as any of the optical pumping source configurations described above with reference to the '823 application.

DETAILED DESCRIPTION

Attention is now directed to FIGS. 13–17, which are diagrammatic end views showing respective stages of manufacture of a dual substrate laminate-configured optical waveguide channel in accordance with the present invention, that may be readily employed in a multi-channel optical fiber ribbon-coupled optical amplifier of the type disclosed in the above-referenced '823 application.

As described briefly above, pursuant to the invention, the compound optical fiber configuration of a respective optical waveguide channel of the type shown in FIG. 9 (wherein a central core and a surrounding cladding layer are formed in the same bulk material) is replaced by a dual bulk laminate structure. In accordance with this dual bulk laminate structure, the core and an associated pumping energy-receiving, pseudo-cladding layer are formed in respectively separate bulk layers, so as to prevent the dopant material of the core from intruding into the pseudo-cladding material.

Figure 13:
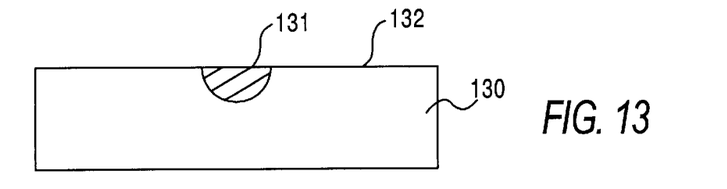
FIGS. 13–17 depict an individual dual-substrate optical waveguide channel at respective stages of its manufacture in accordance with an embodiment of the present invention.

For this purpose, FIG. 13 shows a respective optical signal channel or core 131 formed in the highly planarized and polished surface 132 of a doped bulk glass substrate 130. As a non-limiting example, the substrate 130 may comprise an erbium ytterbium-doped phosphate glass (e.g., phosphate glass containing 22% $Yb^{3+}$ and 2.2% $Er^{3+}$) bulk material. The signal transport channel or core 131 may be formed by the selective implantation of silver (Ag) ions into the (Yb/Er) doped phosphate glass bulk 130.

As in the case of the signal transport channel core of the optical waveguide amplifier architecture disclosed in the '823 application, core 131 is dimensioned to have a cross-section that may nominally conform with that of an associated ribbon fiber (e.g., a center-to-center spacing of 250 microns and core depth and width from 2 to 5 microns), so that the signal core 131 serves as the principal signal transport medium and amplifying medium through the amplifier, for a signal light beam coupled thereto from a respective ribbon fiber of a multi-fiber ribbon section coupled thereto.

Figure 14:
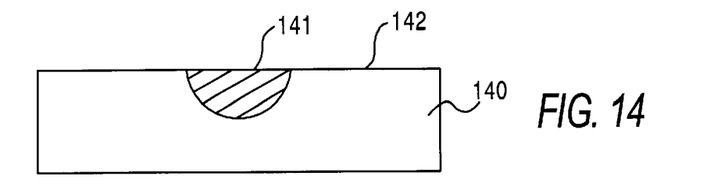

In a similar manner, FIG. 14 shows a pseudo-cladding region or layer 141 formed in the highly planarized and polished surface 142 of a bulk phosphate glass substrate 140.

As a non-limiting example, the pseudo-cladding region/ layer 141 may be formed by selective implantation of high polarizability ions, such as silver, to form a graded optical index phosphate glass region 141, whose dimensions are substantially larger than and whose index of refraction is slightly lower than those of the signal channel core region 131 formed in the bulk glass layer 130. (As a non-limiting example, the implanted cladding region 141 may have a depth on the order of 40–50 microns and a lateral dimension on the order of 60–80 microns.)

Figure 15:
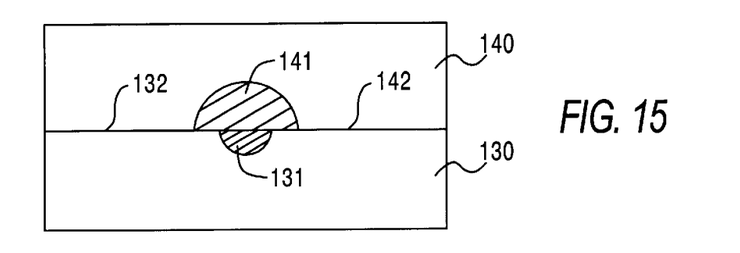

Next, as shown in FIG. 15, after further polishing of their implant introduction surfaces 132 and 142, the two substrates 130 and 140 are bonded together using a suitable optically transmissive epoxy, such as that referenced previously, to place a respective signal core region 131 in the substrate 130 substantially at the midpoint of the surface of larger diameter pseudo-cladding region 141 in the abutting substrate 140. With the pseudo-cladding layer 141 so fixed in intimate contact with the signal transport core 131, optical pumping energy that has been introduced into the pseudo-cladding layer 141 will undergo multiple reflections at the surface perimeter of the layer 141, and directed thereby into the abutting signal transport core region 131, as the pumping beam repeatedly passes back and forth between layer 141 and core 131, where the pumping energy is absorbed, during its propagation along the channel.

Figure 16:
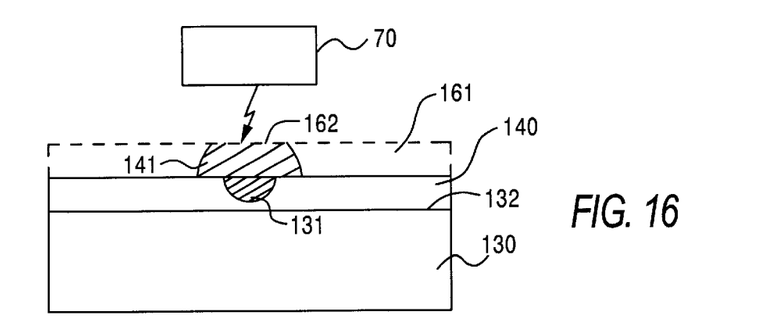
Figure 17:
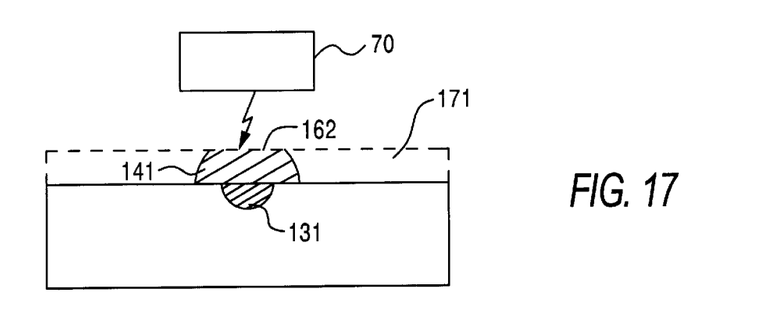

Next, as shown in broken lines 161 in FIG. 16, the back side of the bulk 140 containing the pseudo-cladding material 141 is lapped and polished to a prescribed depth into the material of the pseudo-cladding region 141, so as to expose the pseudo-cladding material, and provide a generally planar surface 162. This lapped planar surface facilitates coupling of the pseudo-cladding layer 141 (and thereby its abutting core 131) with an associated pumping energy source 70, such as any of the optical pumping source embodiments described above with reference to the '823 application. As a non-limiting example, the optical pumping source 70 may comprise any of the optical pumping source configurations of FIGS. 6, 8 and 10–12.

Where the refractive index differential between the pseudo-cladding layer 141 and its adjacent environment (e.g., the material of the undoped glass substrate, proper) is less than desired for optimum internal pumping energy reflection within the layer 141, additional material of the bulk substrate 140 may be selectively removed, as by mechanical abrading and polishing, as shown at broken lines 171 in FIG. 17.

As will be appreciated from the foregoing description, by forming the optical signal core and its associated pumping energy-receiving, cladding layer in respectively separate bulk layers, the present invention ensures that the dopant material of the core cannot intrude into the pseudo-cladding material, so that the undoped cladding material does not undesirably become optically lossy. Once bonded in intimate face-to-face abutment with the core layer, the pseudo-cladding back side of the bulk containing the pseudo-cladding material is lapped and polished to provide a generally planar optically-coupling surface into the pseudo-cladding layer (and thereby its abutting core) from an associated pumping energy source.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed

1. A multi-fiber ribbon-coupled optical amplifier comprising:

a multi-channel optical waveguide structure having a plurality of optical waveguide amplifier channels arranged to be optically coupled with respective ones of a plurality of optical fibers of a multi-fiber ribbon over which respective light beam signals are transportable; and a multi-channel optical interface configured to couple optical energy supplied by a plurality of optical pumping sources into respective ones of said plurality of optical waveguide amplifier channels of said multi-channel optical amplifier from a direction that is generally spatially transverse to said optical waveguide amplifier channels, so as to provide optical energy amplification of said respective light beam signals traveling through said optical waveguide amplifier channels of said multi-channel optical waveguide structure; and wherein said multi-channel optical waveguide structure comprises a first substrate in which are formed a plurality of spatially adjacent signal transport regions that are doped with material that is effective to absorb optical pumping energy coupled thereto, and an abutting second substrate in which are formed a plurality of spatially adjacent pseudo-cladding pumping energy receiving regions, that are exclusive of said material doped that is effective to absorb optical pumping energy with which said optical signal transport regions are doped, and which respectively adjoin said signal transport regions, and wherein a surface of a respective one of said pseudo-cladding pumping energy receiving regions spaced apart from an adjoining signal transport region is configured to receive optical energy supplied by one or more of said optical pumping sources, whereby said optical energy is transferred into said pseudo-cladding region and transferred therefrom and absorbed by its adjoining signal transport region, so as to provide optical energy amplification of a respective light beam signal traveling therethrough.

2. A multi-fiber ribbon-coupled optical amplifier according to claim 1, wherein said surface of a respective one of said pseudo-cladding pumping energy receiving regions is planarized.

3. A multi-fiber ribbon-coupled optical amplifier according to claim 1, further comprising a multi-fiber ribbon input coupler adapted to optically couple light beam signals traveling through respective ones of a plurality of input optical fibers of a multi-fiber ribbon with respective ones of said optical waveguide amplifier channels of said multi-channel optical waveguide structure.

4. A multi-fiber ribbon-coupled optical amplifier according to claim 1, further comprising a multi-fiber ribbon output coupler adapted to optically couple amplified light beam signals traveling through respective ones of said plurality optical waveguide amplifier channels of said multi-channel optical waveguide structure with respective ones of a plurality of output optical fibers of a multi-fiber ribbon.

5. A multi-fiber ribbon-coupled optical amplifier according to claim 1, wherein said multi-channel optical interface includes an array of diffractive optic elements.

6. A multi-fiber ribbon-coupled optical amplifier according to claim 5, wherein said multi-channel optical interface comprises a prism-configured optical energy coupler having a plurality of optical energy focusing elements upon which optical outputs emitted by said plurality of optical pumping sources are incident, and which are operative to focus energy of said optical outputs through said prism and coupled into said truncated unclad optical fibers of said multi-channel optical amplifier.

7. A multi-fiber ribbon-coupled optical amplifier according to claim 1, wherein said multi-channel optical interface includes a plurality of GRIN lenses upon which optical outputs emitted by said plurality of optical pumping sources are incident, and which are operative to focus energy of said optical outputs emitted by said plurality of optical pumping sources into said truncated unclad optical fibers of said multi-channel optical amplifier.

8. A multi-fiber ribbon-coupled optical amplifier according to claim 1, wherein said multi-channel optical interface includes an array of focusing lenslets upon which optical outputs emitted by said plurality of optical pumping sources are incident, and which are operative to focus energy of said optical outputs emitted by said plurality of optical pumping sources into said truncated optical fibers of said multi-channel optical amplifier.

9. A method of making a multi-channel optical waveguide structure comprising the steps of:

(a) providing a first support substrate having a first surface, in which are formed a plurality of spatially adjacent optical signal transport regions doped with material that is effective to absorb optical pumping energy coupled thereto and thereby optically amplify optical signals transported thereby;

(b) providing a second support substrate having a first surface, in which are formed a plurality of spatially adjacent optical pumping energy transporting pseudo-clad regions that are exclusive of said material doped that is effective to absorb optical pumping energy with which said optical signal transport regions are doped;

(c) laminating said first and second support substrates together such that respective ones of said plurality of spatially adjacent optical signal transport regions in said first support substrate adjoin respective ones of said plurality of spatially adjacent optical pumping energy transporting pseudo-clad regions in said second support substrate; and (d) removing material of said second support substrate to expose said pseudo-cladding regions and provide a generally planar surface therein that facilitates coupling of a respective pseudo-cladding region with an associated pumping energy source.

10. A method according to claim 9, further including the step (e) of removing additional material of said second support substrate to expose portions of said pseudo-cladding regions other than said generally planar surface thereof.

* * * * *